(12) United States Patent
Tsuto

(10) Patent No.: US 11,079,844 B2
(45) Date of Patent: Aug. 3, 2021

(54) ELECTRONIC DEVICE

(71) Applicant: FUJIFILM Business Innovation Corp., Tokyo (JP)

(72) Inventor: Satoru Tsuto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 137 days.

(21) Appl. No.: 16/140,568

(22) Filed: Sep. 25, 2018

(65) Prior Publication Data

US 2019/0101982 A1    Apr. 4, 2019

(30) Foreign Application Priority Data

Oct. 2, 2017 (JP) .............................. JP2017-192339

(51) Int. Cl.
*G06F 3/01* (2006.01)
*G06F 3/033* (2013.01)

(52) U.S. Cl.
CPC .............. *G06F 3/014* (2013.01); *G06F 3/016* (2013.01); *G06F 3/033* (2013.01); *G06F 2203/0331* (2013.01)

(58) Field of Classification Search
None
See application file for complete search history.

(56) References Cited

U.S. PATENT DOCUMENTS

2008/0226134 A1* 9/2008 Stetten .................... G06F 3/016
382/114

FOREIGN PATENT DOCUMENTS

| JP | 2001166676 | 6/2001 |
|---|---|---|
| JP | 2003316493 | 11/2003 |
| JP | 2008171409 | 7/2008 |

* cited by examiner

*Primary Examiner* — Nicholas J Lee
(74) *Attorney, Agent, or Firm* — JCIPRNET

(57) ABSTRACT

An electronic device includes a contact portion that comes into contact with a ventral side of a finger and performs at least one of presenting stimulation to the finger or acquiring information from the finger. The electronic device is mounted on the finger such that a portion of the finger from a first joint to a fingertip on the ventral side of the finger is exposed except for a portion of the finger, which comes into contact with the contact portion.

18 Claims, 8 Drawing Sheets

ELECTRONIC DEVICE

CROSS-REFERENCE TO RELATED APPLICATIONS

This application is based on and claims priority under 35 USC 119 from Japanese Patent Application No. 2017-192339 filed Oct. 2, 2017.

BACKGROUND

Technical Field

The present invention relates to an electronic device.

SUMMARY

According to an aspect of the invention, there is provided an electronic device which includes a contact portion that comes into contact with a ventral side of a finger and performs at least one of presenting stimulation to the finger or acquiring information from the finger. The electronic device is mounted on the finger such that a portion of the finger from a first joint to a fingertip on the ventral side of the finger is exposed except for a portion of the finger, which comes into contact with the contact portion.

BRIEF DESCRIPTION OF THE DRAWINGS

Exemplary embodiment(s) of the present invention will be described in detail based on the following figures, wherein:

FIG. 6A is a diagram illustrating a first state of the servomotor and the second contact portion, and FIG. 6B is a diagram illustrating a second state of the servomotor and the second contact portion;

DETAILED DESCRIPTION

Figure 1:
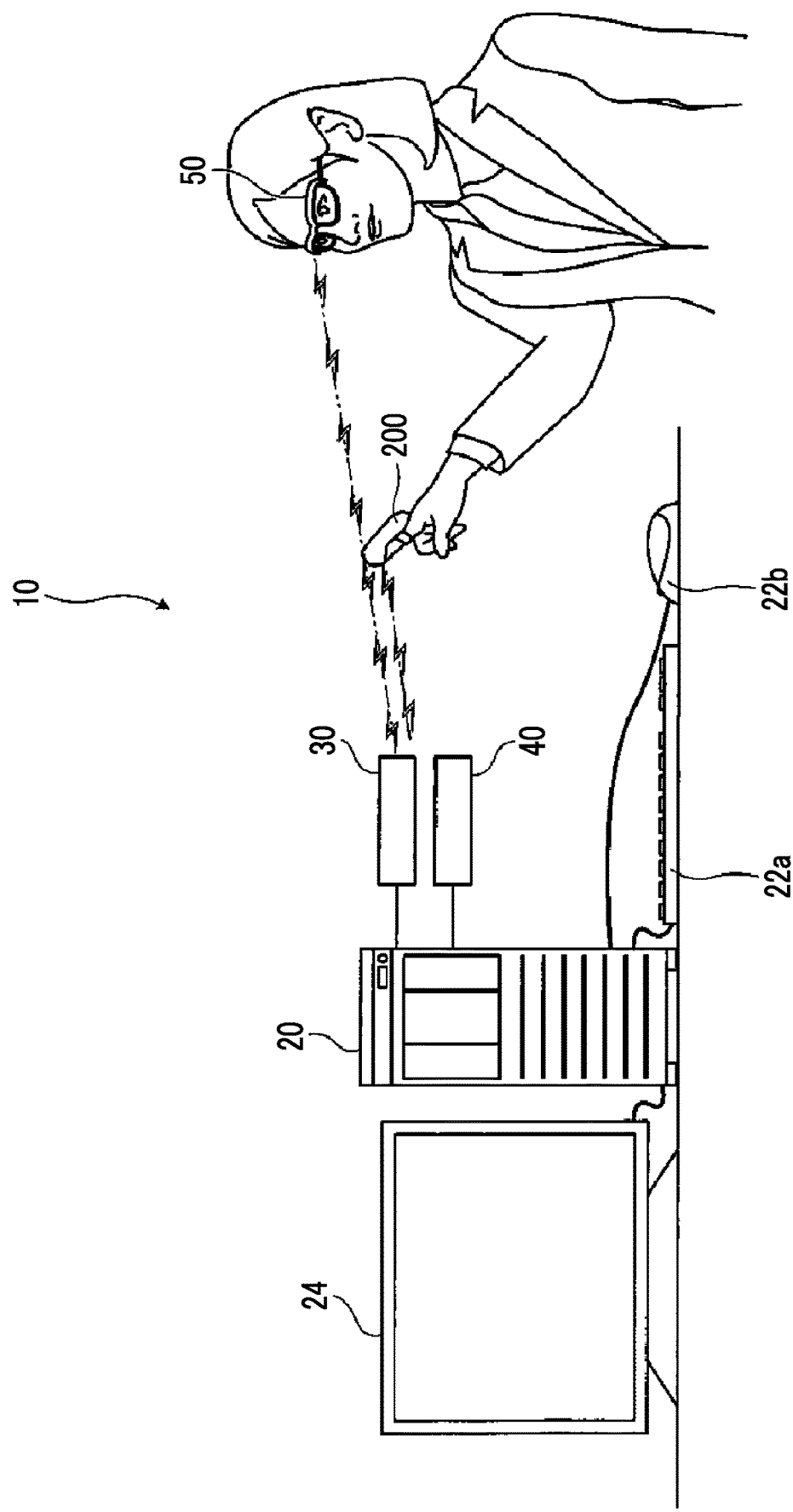
FIG. 1 is a diagram illustrating a tactile sense presentation system used in an exemplary embodiment of the present invention.

Hereinafter, an exemplary embodiment of the present invention will be described in detail with reference to the drawings. FIG. 1 illustrates a tactile sense presentation system 10 used in the exemplary embodiment of the present invention. As illustrated in FIG. 1, the tactile sense presentation system 10 includes a data processing apparatus 20, a head-mounted display device 50, and a tactile sense presentation device 200.

The data processing apparatus 20 processes data used for controlling the head-mounted display device 50 or the tactile sense presentation device 200. For example, a personal computer may be used as the data processing apparatus 20. An input device 22 and a display device 24 are attached to the data processing apparatus 20. For example, a keyboard 22a or a mouse 22b may be used as the input device 22. For example, a liquid crystal display device is used as the display device 24.

The head-mounted display device 50 is a display device used in a state of being mounted on the head in a manner of an operator wearing glasses. For example, a retinal scanning type display device may be used as the head-mounted display device. The head-mounted display device 50 performs display such that a virtual image generated by the data processing apparatus 20 is superimposed on an object which actually exists as a physical three-dimensional object such as the keyboard 22a or the mouse 22b.

The tactile sense presentation device 200 is an example of an electronic device. The tactile sense presentation device 200 is a device that presents the tactile sense to the operator as though the operator actually touches a virtual object. In the exemplary embodiment, the tactile sense presentation device presents a tactile sense to the operator as though actually touching a virtual object which is generated by the data processing apparatus 20 and is displayed by the head-mounted display device 50. The tactile sense presentation device 200 is used in a state of being mounted on the finger of an operator. Details of the tactile sense presentation device 200 will be described later.

The tactile sense presentation system 10 further includes a transmission and reception device 30. The transmission and reception device 30 transmits data processed by the data processing apparatus 20 to the head-mounted display device 50 or the tactile sense presentation device 200, for example, in a wireless manner. The transmission and reception device 30 receives data transmitted from the head-mounted display device 50 or the tactile sense presentation device 200.

The tactile sense presentation system 10 further includes a detection device 40. The detection device 40 detects the position of the finger of the operator and the position of the tactile sense presentation device 200 and detects the motion of the finger of the operator and the motion of the tactile sense presentation device 200. For example, the tactile sense presentation device 200 includes two light irradiation devices (not illustrated) or greater and imaging devices (not illustrated) of which the number is equal to the number of light irradiation devices. The imaging devices perform imaging of the finger and the tactile sense presentation device 200 which are irradiated with light by the light irradiation devices. The data processing apparatus 20 performs processing on an image obtained by imaging of each of the imaging devices such that the positions of the finger and the tactile sense presentation device 200 and the motions of the finger and the tactile sense presentation device.

Instead of detecting the position of the finger of the operator, the position of the tactile sense presentation device 200, the motion of the finger of the operator, and the motion of the tactile sense presentation device 200 by the detection device 40 connected to the data processing apparatus 20 as described above, an acceleration sensor (not illustrated) and a gyro sensor (not illustrated) may be provided in the tactile sense presentation device 200. The position of the finger of the operator, the position of the tactile sense presentation device 200, the motion of the finger of the operator, and the motion of the tactile sense presentation device 200 may be specified by the transmission and reception device 30 receiving outputs of the acceleration sensor and the gyro sensor and the data processing apparatus 20 performing processing on the received outputs.

Figure 2:
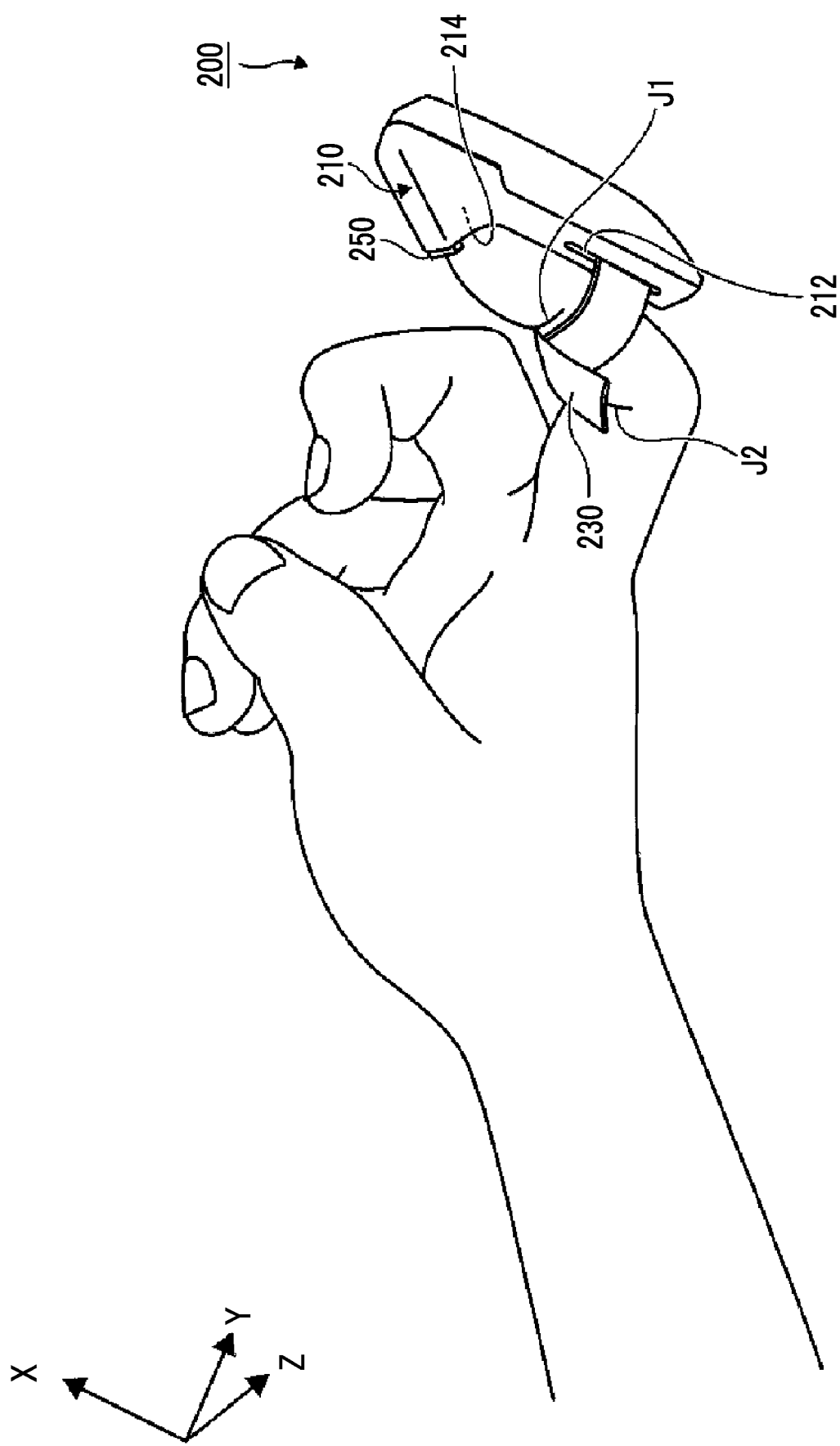
FIG. 2 is a diagram illustrating a state where a tactile sense presentation device which is provided in the tactile sense presentation system illustrated in FIG. 1 and is used in the exemplary embodiment of the present invention is mounted on an index finger of a right hand.

FIG. 2 illustrates a state where the tactile sense presentation device 200 is mounted on the finger of the operator. FIG. 2 illustrates an example in which the tactile sense presentation device 200 is mounted on the index finger of the right hand of the operator. However, the tactile sense presentation device 200 may be mounted, for example, on any finger of the hand of the operator, such as the middle finger of the left hand. FIG. 2 illustrates an example in which the tactile sense presentation device 200 is mounted on only one finger of the operator. However, for example, the tactile sense presentation device 200 may be mounted on each of plural fingers of the operator, all of the ten fingers of the operator.

As illustrated in FIG. 2, the tactile sense presentation device 200 includes a device main body 210. An insertion portion 214 into which a finger is inserted is formed in the device main body 210. A fixation band 230 is attached to the device main body 210. The fixation band 230 is an example of a fixation portion. The fixation band is used for fixing the tactile sense presentation device 200 to the finger. For example, a hook-and-loop fastener, a belt having plural holes, an elastic member having a variable circumference, and the like may be used as the fixation band 230, in order to correspond to a difference in circumferential length of a finger varying depending on a person.

The fixation band 230 is mounted on a finger so as to come into contact with a portion of the finger on which the tactile sense presentation device 200 is mounted, on the second joint J2 side instead of the first joint J1 thereof. Here, for example, the fixation band 230 is desirably mounted on the finger on which the tactile sense presentation device 200 is mounted, so as to avoid the second joint J2. In addition, for example, the fixation band 230 is more desirably mounted on the finger on which the tactile sense presentation device 200 is mounted, so as to come into contact with the finger at a position between the first joint J1 and the second joint J2 thereof.

For example, the fixation band 230 is desirably mounted on the finger on which the tactile sense presentation device 200 is mounted, by using friction between the fixation band and the skin of the finger such that the fixation band 230 is not separated from the finger. For example, a configuration in which the fixation band 230 is formed of a material having elasticity and the tactile sense presentation device 200 is fixed to the finger by elastic deformation of the fixation band 230 from a stretched state to a contracted state is desirably made. The tactile sense presentation device 200 may be fixed at a position between the first joint J1 and the second joint J2 by using the fixation band 230 which is not elastically deformed.

The fixation band 230 may move on the device main body 210 in the length direction of the finger. That is, long holes 212 for guide may be formed in the device main body 210 and the fixation band 230 may move in the length direction of the finger in a manner of being guided in the long hole 212.

The tactile sense presentation device 200 further includes a first contact portion 250. The first contact portion 250 comes into contact with the ventral side of a finger (opposite side of a nail side of the finger, a side on which the fingerprint is provided). The first contact portion 250 performs at least one of presenting stimulation to the finger or acquiring information from the finger. In the exemplary embodiment, an actuator is used as the first contact portion 250. The actuator vibrates and the vibration is transmitted to the ventral side of the finger as presentation of stimulation to the finger.

The first contact portion 250 may be configured to acquire information from the finger instead of presenting stimulation to the finger. For example, the first contact portion 250 may be configured as a pulse acquisition device that acquires the pulse of the operator. The first contact portion 250 may be configured to present stimulation to the finger and to acquire information from the finger.

As illustrated in FIG. 2, the tactile sense presentation device 200 is mounted on the finger such that a portion of the finger from the first joint J1 to the fingertip on the ventral side of the finger except for a portion of the finger with which the first contact portion 250 comes into contact is exposed to the outside of the device main body 210. The portion of the finger, which is exposed from the device main body 210 may come into contact with an object which actually exists as a physical three-dimensional object such as the keyboard 22a or the mouse 22b, for example.

Figure 3:
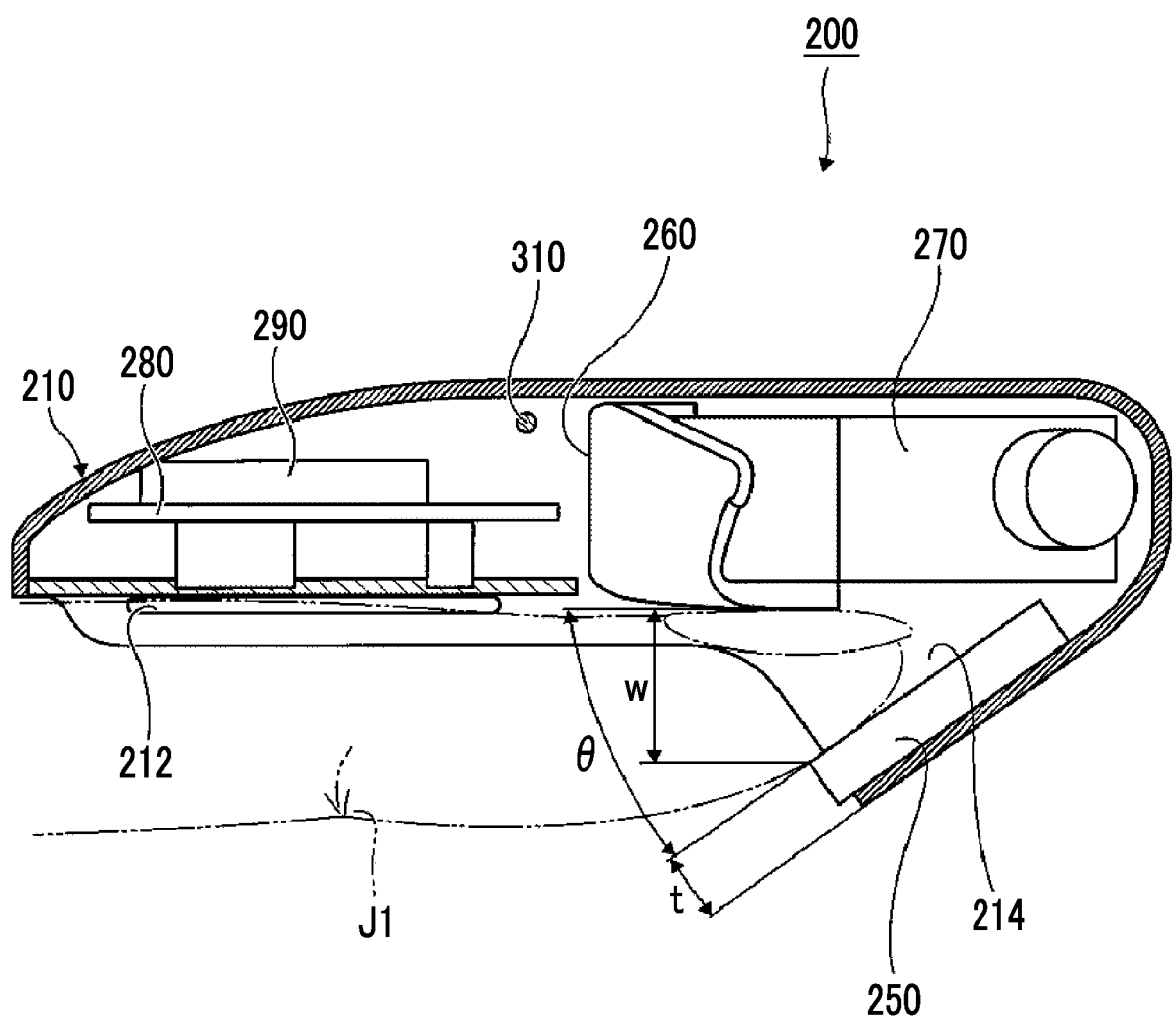
FIG. 3 is a first sectional view illustrating the tactile sense presentation device illustrated in FIG. 2.
Figure 3:
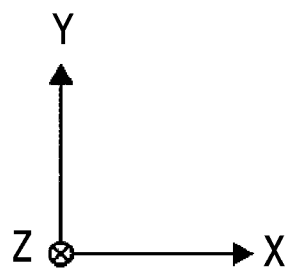
Figure 4:
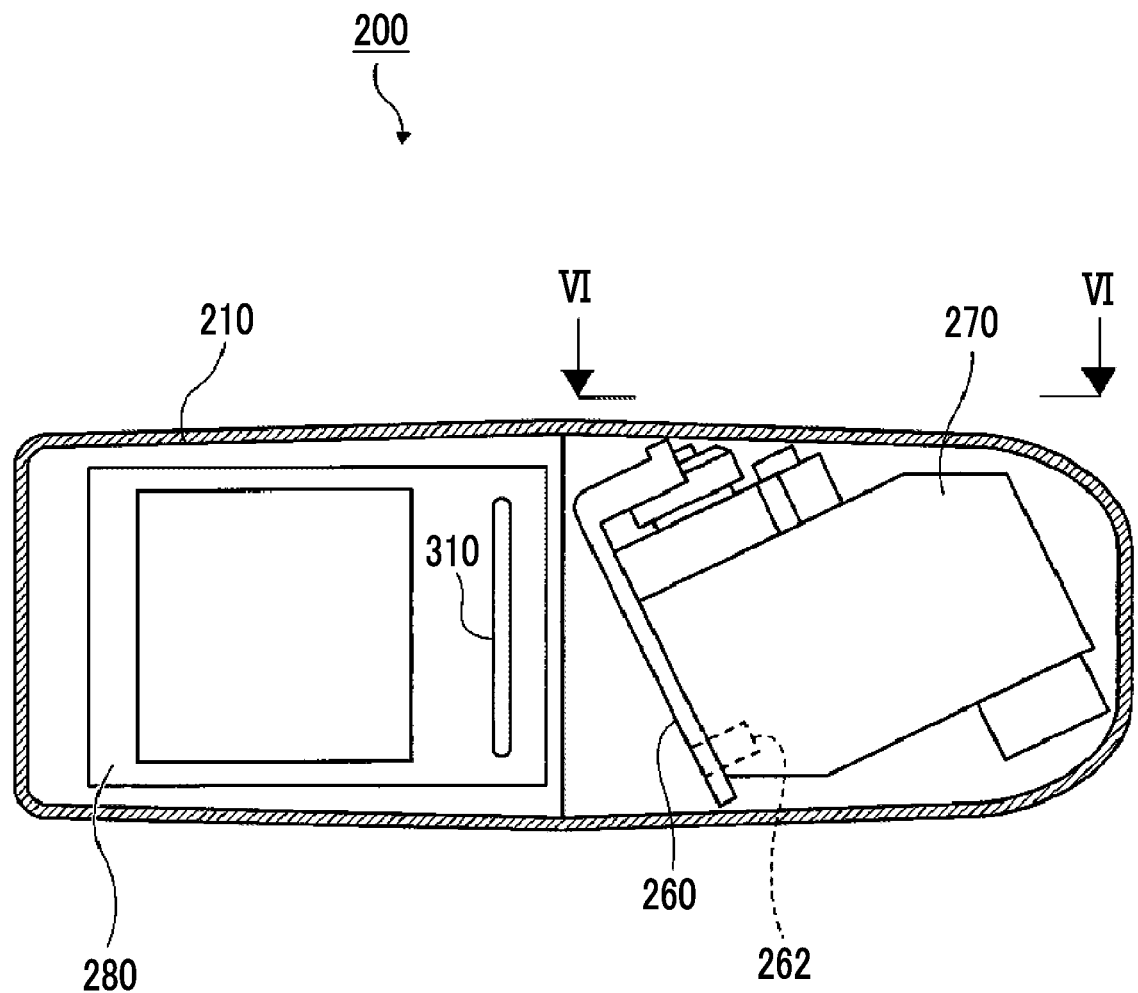
FIG. 4 is a second sectional view illustrating the tactile sense presentation device illustrated in FIG. 2.
Figure 5:
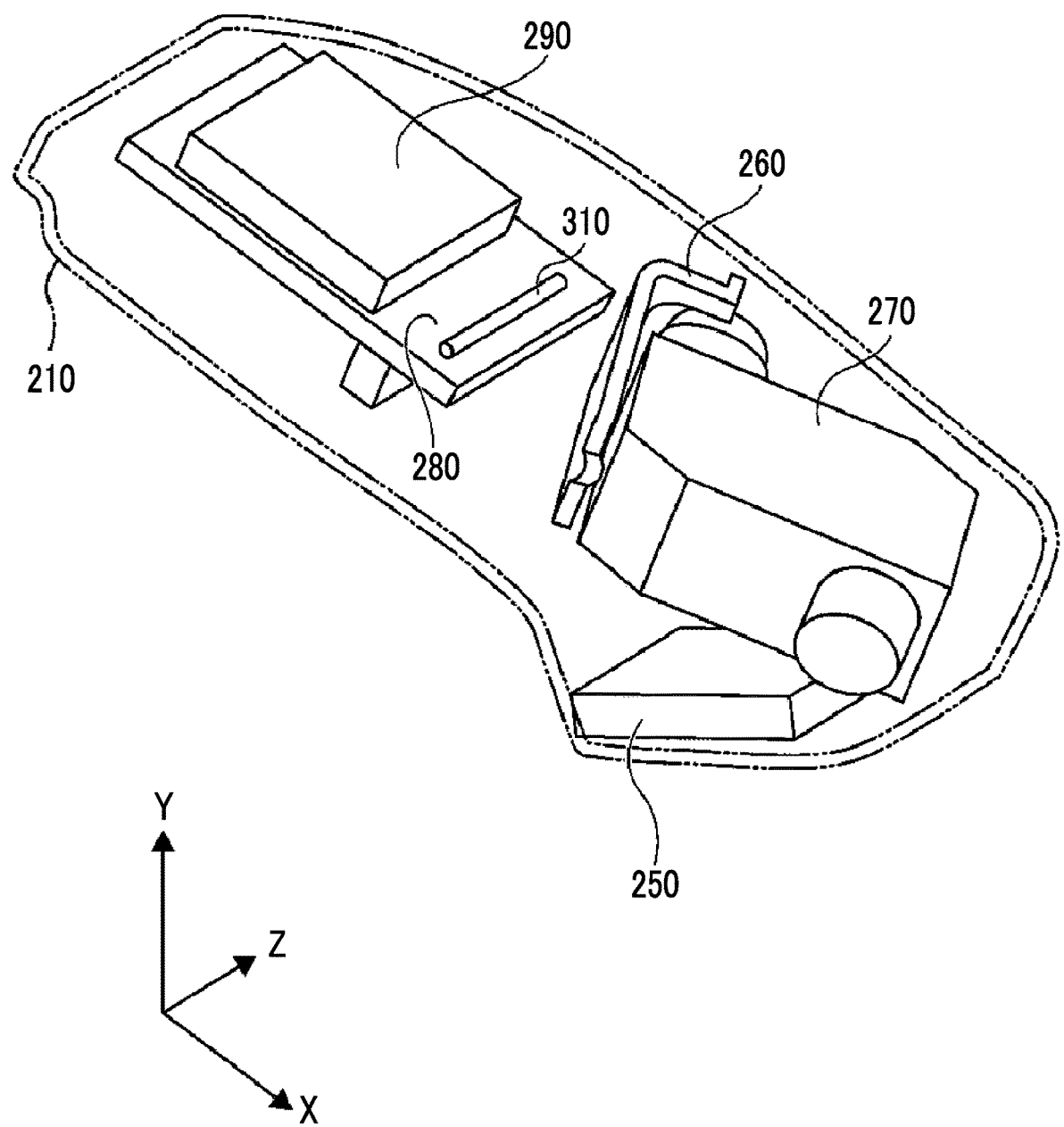
FIG. 5 is a perspective view illustrating the tactile sense presentation device illustrated in FIG. 2.

FIGS. 3 to 5 illustrate the tactile sense presentation device 200. As illustrated in FIG. 3, the thickness t of a portion of the tactile sense presentation device 200, which comes into contact with the ventral side of the finger is set to 4 mm. For example, the thickness t is desirably a thickness which does not cause an interference in a plane (for example, see a plane P in FIG. 7) with which the exposed portion of the finger from the first joint J1 to the fingertip comes into contact. For example, the thickness t is desirably equal to or smaller than 5 mm.

As illustrated in FIG. 3, the above-described insertion portion 214 has a wedge shape in which a tip side of the inserted finger becomes narrower and the first joint J1 side of the inserted finger becomes wider. As described above, the insertion portion 214 has a wedge shape formed to be interposed between substantially two surfaces straddling a tip of the surface of the fingertip on the ventral side of the finger and a tip of the nail-side surface of the fingertip. Thus, an insertion length of a fingertip portion of the finger, which is inserted into the insertion portion 214 is limited and it is difficult to bring the nail tip into contact with the back side of the insertion portion 214. Therefore, even in a case of a person having a relatively long nail, the tactile sense presentation device 200 can be stably held.

Here, the above-described nail-side surface is not limited to a surface positioned over the nail as illustrated in FIG. 3 and may be a surface positioned between the first joint and the nail. Regarding the insertion portion 214, a wedge shape may be formed to be interposed between two surfaces positioned on both side surface sides of the skin or the nail. For example, the insertion portion 214 is desirably in a state where the two surfaces of forming a wedge shape to be interposed do not intersect with each other on the narrow side of the insertion portion 214 (back side of the insertion portion 214) and thus the narrow side of the insertion portion 214 is not physically closed.

An angle θ formed by two surfaces which form a wedge shape and face each other is 35 degrees, for example. For example, the angle θ is desirably equal to or smaller than 45 degrees. In a case where the angle θ is greater than 45 degrees, the tactile sense presentation device 200 is easily separated from the finger. For example, the angle θ is desirably equal to or greater than 25 degrees. In a case where the angle θ is smaller than 25 degrees, it is necessary that the length of the insertion portion 214 in a direction in which the finger is inserted is increased in order to allow insertion of the finger, and thus the size of the tactile sense presentation device 200 may be increased.

The width W (FIG. 3) of the insertion portion 214 in a direction intersecting with the direction in which the finger is inserted into the insertion portion, that is, a frontage dimension of the insertion portion 214 in the direction intersecting with the direction in which the finger is inserted into the insertion portion is, for example, 7.6 mm. For example, the width W is desirably equal to or greater than 4.0 mm. Generally, a gap as a reference allowing prevention of finger pinching is equal to or smaller than 4.0 mm which is defined in "Safety distance against penetration of upper limbs in JIS B970". Conversely, a structure of easily locking the fingertip to the insertion portion is secured by setting the width to be equal to or greater than 4.0 mm.

For example, the width W is desirably equal to or smaller than 8.9 mm. In a case where the width W is set to be equal to or smaller than 8.9 mm, the width is not greater than 8.9 mm which is the 2.5th percentile value of dimensional data which is dimensional data of a hand of the Japanese measured by National Institute of Advanced Industrial Science and Technology (AIST) and is dimensional data of a distal joint thickness of the fifth finger (little finger) of a female. As described above, the tactile sense presentation device 200 may be mounted on any finger or may be used in a state of being mounted on the little finger of a right hand or the little finger of a left hand. The tactile sense presentation device 200 is used regardless of the gender of the operator.

As illustrated in FIGS. 3 to 5, the tactile sense presentation device 200 further includes a second contact portion 260. The second contact portion 260 is an example of another contact portion. The second contact portion 260 performs at least one of presenting stimulation to a finger or acquiring information from the finger. The second contact portion 260 comes into contact with the nail side of the finger. That is, the second contact portion 260 comes into contact with a side of the finger, which is opposite to a side of the finger with which the first contact portion 250 comes into contact. The second contact portion 260 is provided so as to be capable of rotating with respect to the main body of the servomotor 270 which will be described later, by using a shaft 262 (see FIG. 4).

In the exemplary embodiment, the second contact portion 260 is configured to perform displacement by an actuator such that the width W of the wedge shape formed by the insertion portion 214 is reduced or increased. The fingertip is pinched and thus the second contact portion 260 presents a tactile sense to the fingertip. More specifically, the second contact portion 260 presents contact pressure when the fingertip is touched on an object, to the finger by pinching the fingertip and thus A mechanism of moving the second contact portion 260 and an actuator of moving the second contact portion 260 will be described later.

Here, in a case where an actuator (set as a first actuator below) constituting the first contact portion 250 and an actuator (set as a second actuator below) of moving the second contact portion 260 are compared to each other, the first actuator has a frequency band which is higher than that of the second actuator. As described above, the first contact portion 250 is an example of a high-frequency driving unit that drives at a frequency higher than that of the second contact portion 260. The second contact portion 260 is an example of a low-frequency driving unit that drives at a frequency lower than that of the first contact portion 250.

Generally, an actuator has a limited driving frequency and a limited displacement. Thus, for example, as in the exemplary embodiment, a combination of plural actuators having different driving frequencies and different displacements from each other is desirably used. In a case where the band of the driving frequency of the actuator is wide and a range of the displacement of the actuator is wide, one actuator may be used instead of using the plural actuators.

Similar to the first contact portion 250, the second contact portion 260 may be configured to acquire information from the finger instead of presenting stimulation to the finger or may be configured to present stimulation to the finger and to acquire information from the finger.

As illustrated in FIGS. 3 to 5, the tactile sense presentation device 200 further includes the servomotor 270, a driving controller 280, a wireless communication unit 290, an antenna device 310, and a power source (not illustrated). The servomotor 270 is an example of the second actuator of moving the second contact portion 260. The driving controller 280 controls the first contact portion 250 and the servomotor 270 to drive. The wireless communication unit 290 wirelessly communicates with, for example, the transmission and reception device 30 and thus receives a signal transmitted from the transmission and reception device 30 and transmits a signal to be received by the transmission and reception device 30. The antenna device 310 is used for wireless communication of a signal along with the wireless communication unit 290.

Figure 6A:
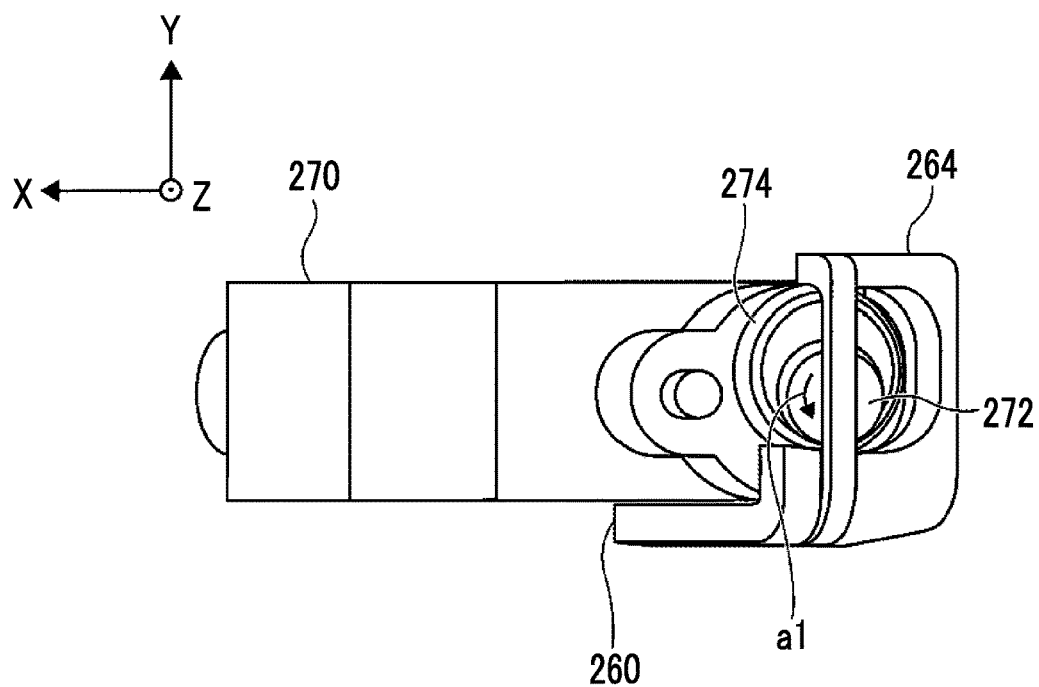
FIGS. 6A and 6B illustrate a servomotor and a second contact portion of the tactile sense presentation device illustrated in FIG. 2 from a direction indicated by arrows VI-VI in FIG. 4.
Figure 6B:
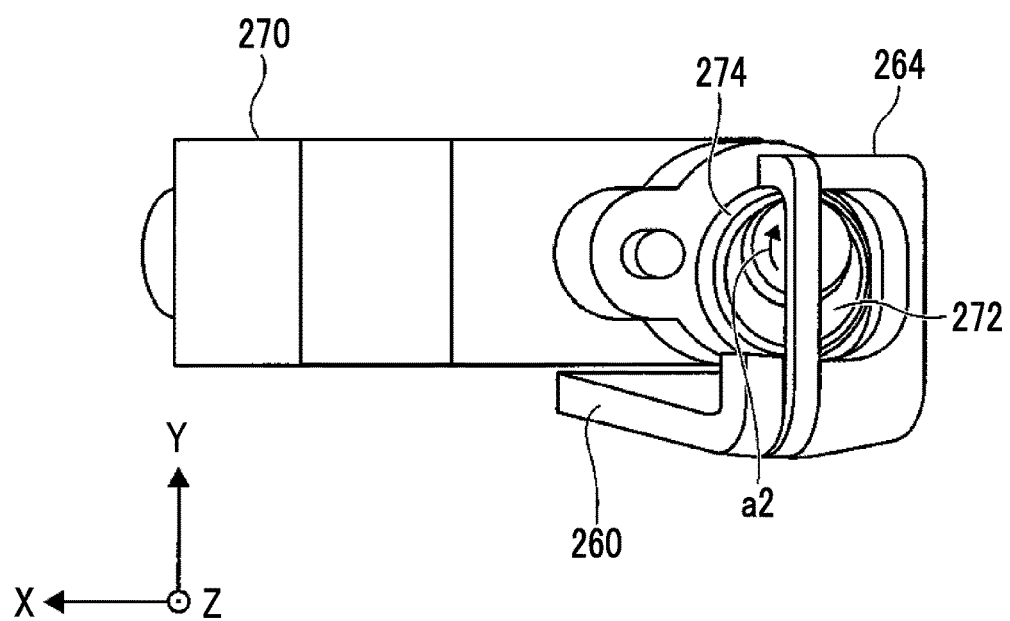

FIGS. 6A and 6B illustrate a mechanism of moving the second contact portion 260 and the servomotor 270. As illustrated in FIGS. 6A and 6B, the servomotor 270 includes a rotation shaft 272. A cam member 274 is mounted on the rotation shaft 272. The cam member 274 is eccentric and an outer circumferential surface thereof is in contact with a cam-member contact surface 264 formed in the second contact portion 260.

In a case where the rotation shaft 272 rotates in a direction indicated by an arrow a2, from a state illustrated in FIG. 6B, the cam-member contact surface 264 is pushed up by the cam member 274 which rotates along with the rotation shaft 272. Since the cam-member contact surface 264 is pushed up, the second contact portion 260 moves to be directed from a position illustrated in FIG. 6B to a position illustrated in FIG. 6A, to rotate around the shaft 262 (see FIG. 4), and to be raised.

In a case where the rotation shaft 272 rotates in a direction indicated by an arrow a1, from the state illustrated in FIG. 6A, the cam-member contact surface 264 is pushed down by the cam member 274 which rotates along with the rotation shaft 272. Since the cam-member contact surface 264 is pushed down, the second contact portion 260 moves to be directed from the position illustrated in FIG. 6A to the position illustrated in FIG. 6B, to rotate around the shaft 262 (see FIG. 4), and to descend.

Here, a portion of a movable range of the mechanism of moving the second contact portion 260 may be assigned to the width W (illustrated in FIG. 3) of the insertion portion 214 in the direction intersecting with the direction in which the finger is inserted. Thus, for example, regarding a little finger which is small even in a case of an adult, or a finger of a women or a child, the width W may be reduced in an appropriate range in order to largely expose the finger pulp portion.

Figure 7:
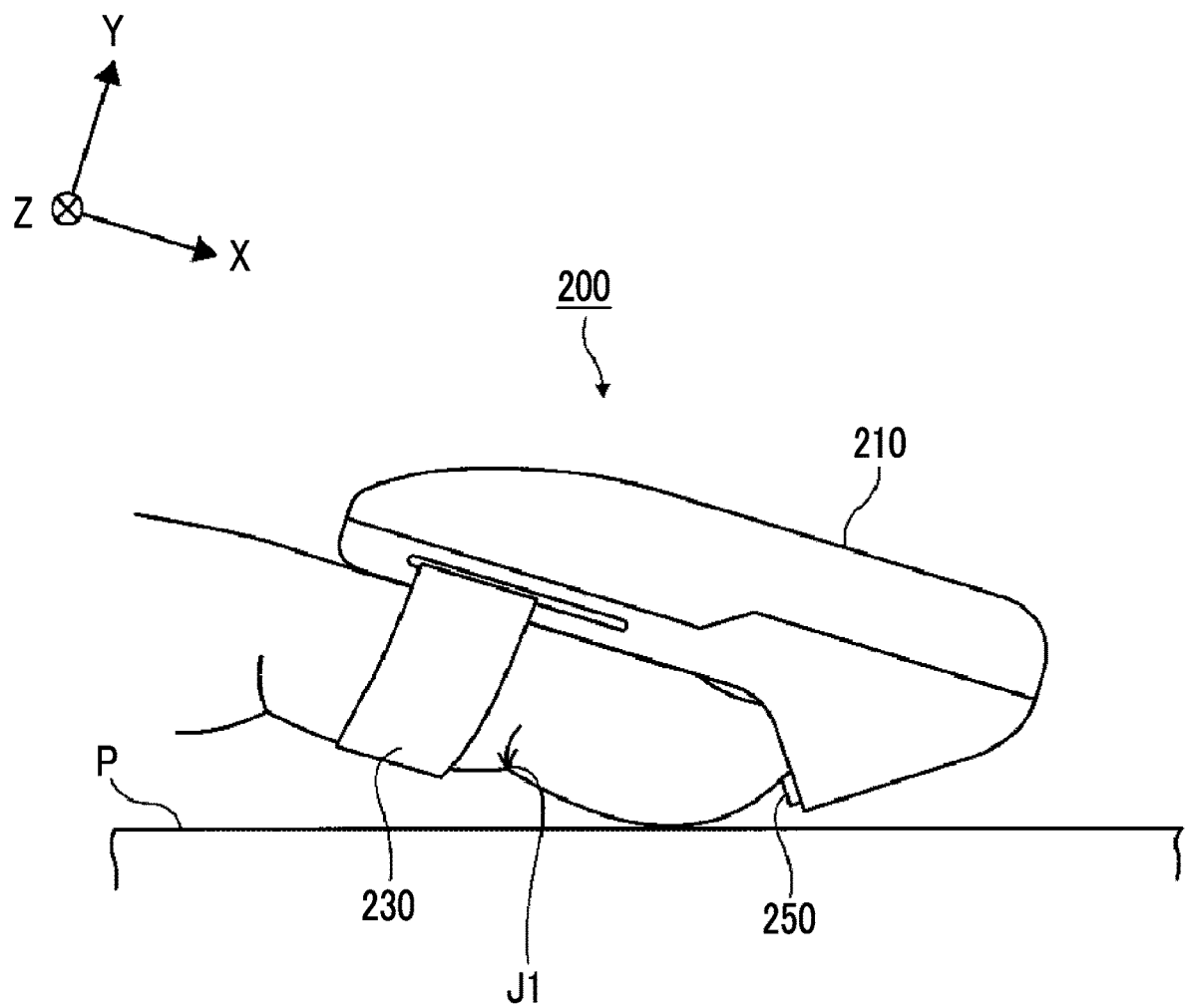
FIG. 7 is a diagram illustrating a state where an exposed portion from a first joint to a fingertip of the finger, on which the tactile sense presentation device illustrated in FIG. 2 is mounted, comes into contact with a plane.

FIG. 7 illustrates a state where a portion of the finger, which is from the first joint J1 to the fingertip on the ventral side of the finger on which the tactile sense presentation device 200 is mounted and is exposed from the device main body 210 is in contact with the plane P. As illustrated in FIG. 7, the tactile sense presentation device 200 has a shape which does not cause an interference in the plane P with which the portion of the finger, which is from the first joint J1 to the fingertip on the ventral side of the finger and is exposed from the device main body 210 is in contact. Since the finger pulp is rounded, the plane P has plural possibilities depending on a position in the length direction of the finger, a position in a width direction of the finger, and an inclination. FIG. 7 illustrates one plane P as an example of the plane P having the plural possibilities.

Figure 8:
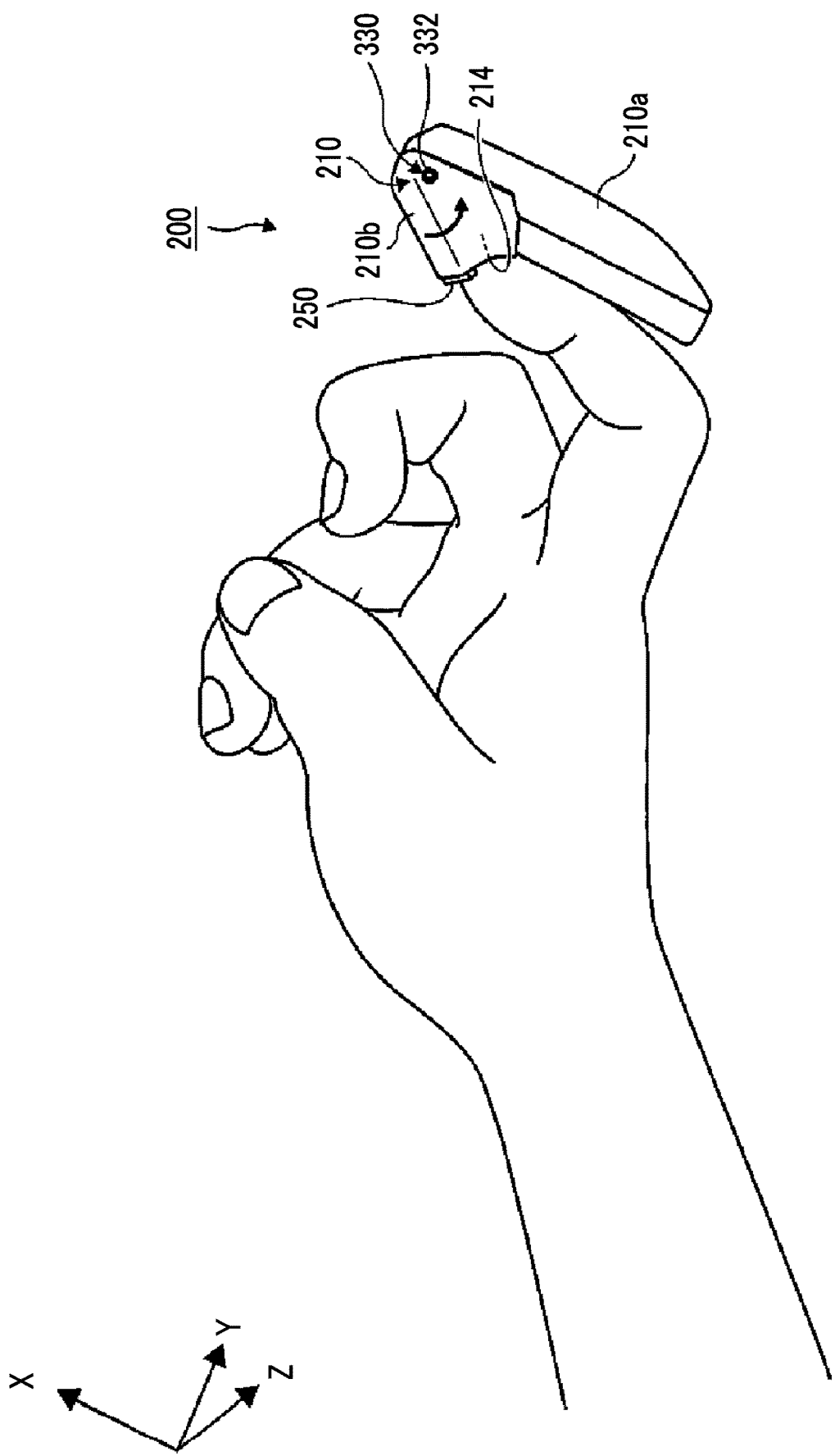
FIG. 8 is a diagram illustrating a state where a modification example of the tactile sense presentation device is mounted on the index finger of the right hand.

FIG. 8 illustrates a modification example of the tactile sense presentation device 200. In the modification example, the device main body 210 includes a nail-side main body 210a and a finger ventral-side main body 210b. The nail-side main body 210a and the finger ventral-side main body 210b are joined to each other by using a hinge 332. In the modification example, the tactile sense presentation device 200 further includes a pinch mechanism 330 in addition to the configuration of the above-described exemplary embodiment. The pinch mechanism 330 is a mechanism of mounting the tactile sense presentation device 200 on a finger by pinching the finger. The pinch mechanism 330 includes the above-described hinge 332 and a biasing unit (not illustrated) such as a spring member, for example. The above-described biasing unit biases the finger ventral-side main body 210b such that the finger ventral-side main body 210b rotates around the hinge 332 in a direction approaching the nail-side main body 210a.

Although not illustrated in FIG. 8, in the above-described modification example, the tactile sense presentation device may include the fixation band 230 (for example, see FIG. 2).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic device comprising:
a contact portion that comes into contact with a ventral side of a finger and performs at least one of presenting stimulation to the finger or acquiring information from the finger,
wherein the electronic device is mounted on the finger such that a portion of the finger from a first joint to a fingertip on the ventral side of the finger is exposed except for a portion of the finger, which comes into contact with the contact portion, and the electronic device does not interfere in a plane coming into contact with the exposed portion.

2. An electronic device which is capable of being mounted on a finger such that a portion of a half or greater of an area which is from a first joint to a fingertip of the finger on the first joint side and is on a ventral side of the finger is exposed, and the electronic device does not interfere in a plane coming into contact with the exposed portion.

3. An electronic device comprising:
a device main body in which an insertion portion into which a fingertip is inserted is formed, and the insertion portion has a shape in which a tip side of an inserted finger becomes narrow and a first joint side thereof becomes wide and is formed to be interposed between substantially two surfaces straddling a nail tip; and
a contact portion that is mounted on the device main body, comes into contact with a ventral side of the inserted finger, and performs at least one of presenting stimulation to the inserted finger or acquiring information from the inserted finger,
wherein the electronic device is mounted on the finger inserted so as to cause a portion from a first joint to a fingertip on the ventral side of the inserted finger to be exposed from the device main body except for a portion of the finger, which comes into contact with the contact portion.

4. The electronic device according to claim 3,
wherein a frontage dimension of the insertion portion in a direction intersecting with a direction in which the finger is inserted is from 4.0 mm to 8.9 mm.

5. The electronic device according to claim 3,
wherein a frontage dimension of the insertion portion in a direction intersecting with a direction in which the finger is inserted is from 4.0 mm to 8.9 mm.

6. The electronic device according to claim 1,
wherein the electronic device does not interfere in a plane coming into contact with an exposed portion which is on the ventral side of the finger and is from the first joint to the fingertip.

7. The electronic device according to claim 2,
wherein the electronic device does not interfere in a plane coming into contact with an exposed portion which is on the ventral side of the finger and is from the first joint to the fingertip.

8. The electronic device according to claim 3,
wherein the electronic device does not interfere in a plane coming into contact with an exposed portion which is on the ventral side of the finger and is from the first joint to the fingertip.

9. The electronic device according to claim 4,
wherein the electronic device does not interfere in a plane coming into contact with an exposed portion which is on the ventral side of the finger and is from the first joint to the fingertip.

10. The electronic device according to claim 5,
wherein the electronic device does not interfere in a plane coming into contact with an exposed portion which is on the ventral side of the finger and is from the first joint to the fingertip.

11. The electronic device according to claim 1,
wherein a portion in contact with the ventral side of the finger has a thickness so as not to interfere in a plane coming into contact with an exposed portion of the finger from the first joint to the fingertip.

12. The electronic device according to claim 2,
wherein a portion in contact with the ventral side of the finger has a thickness so as not to interfere in a plane coming into contact with an exposed portion of the finger from the first joint to the fingertip.

13. The electronic device according to claim 3,
wherein a portion in contact with the ventral side of the finger has a thickness so as not to interfere in a plane coming into contact with an exposed portion of the finger from the first joint to the fingertip.

14. The electronic device according to claim 1, further comprising:
a fixation portion that fixes the electronic device to the finger, wherein the fixation portion comes into contact with the finger at a position on a second joint side of the finger instead of the first joint side thereof.

15. The electronic device according to claim 14, wherein the fixation portion is capable of moving in a length direction of the finger.

16. The electronic device according to claim 1, further comprising:
a pinch mechanism that pinches the finger,
wherein the electronic device is mounted by pinching the finger with the pinch mechanism.

17. The electronic device according to claim 1, further comprising:
another contact portion that comes into contact with the finger and performs at least one of presenting stimulation to the finger or acquiring information from the finger.

18. The electronic device according to claim 17, wherein the other contact portion comes into contact with a nail-side surface of the finger.

* * * * *